(12) United States Patent
Kitamura

(10) Patent No.: US 8,543,050 B2
(45) Date of Patent: Sep. 24, 2013

(54) BEARING MEMBER, BELT UNIT, AND IMAGE FORMING DEVICE

(75) Inventor: Makoto Kitamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 607 days.

(21) Appl. No.: 12/490,565

(22) Filed: Jun. 24, 2009

(65) Prior Publication Data

US 2010/0003059 A1    Jan. 7, 2010

(30) Foreign Application Priority Data

Jul. 1, 2008  (JP) .................................. 2008-172554

(51) Int. Cl.
  *G03G 15/00*   (2006.01)
  *F16C 33/10*   (2006.01)
(52) U.S. Cl.
  USPC ............. 399/388; 399/381; 310/90; 384/129
(58) Field of Classification Search
  USPC ................... 310/90; 384/129; 399/381, 388
  See application file for complete search history.

(56) References Cited

U.S. PATENT DOCUMENTS

| 4,579,211 | A * | 4/1986 | Renaud ............................ 192/98 |
| 5,932,946 | A * | 8/1999 | Miyasaka et al. ............. 310/90.5 |
| 6,023,114 | A * | 2/2000 | Mori et al. ....................... 310/90 |
| 6,316,856 | B1 * | 11/2001 | Kusaki et al. ................... 310/90 |
| 6,380,651 | B1 * | 4/2002 | Yamaguchi et al. ............. 310/90 |
| 2005/0111769 | A1 * | 5/2005 | Haga ............................... 384/119 |
| 2005/0268466 | A1 * | 12/2005 | Miki ........................... 29/898.02 |
| 2006/0079358 | A1 * | 4/2006 | Igarashi .......................... 474/87 |
| 2006/0192451 | A1 * | 8/2006 | Hong et al. ..................... 310/90 |
| 2007/0076991 | A1 * | 4/2007 | Huang et al. .................. 384/107 |
| 2008/0056632 | A1 * | 3/2008 | Yoshimura et al. ........... 384/400 |
| 2009/0028476 | A1 * | 1/2009 | Ai et al. ......................... 384/114 |

FOREIGN PATENT DOCUMENTS

| JP | 58091392 A | * | 5/1983 |
| JP | 58221018 A | * | 12/1983 |
| JP | 60237222 A | * | 11/1985 |
| JP | 62167922 A | * | 7/1987 |
| JP | 02264182 A | * | 10/1990 |
| JP | 05115146 A | * | 5/1993 |
| JP | 2005-189702 A | | 7/2005 |
| JP | 2005189702 A | * | 7/2005 |
| SU | 800448 B | * | 1/1981 |
| SU | 1606737 A | * | 11/1990 |
| SU | 1739098 A1 | * | 6/1992 |

OTHER PUBLICATIONS

Machine Translation of JP 2005189702 A, JPO, Feb. 26, 2012.*

* cited by examiner

*Primary Examiner* — Matthew G Marini
*Assistant Examiner* — Nguyen Q Ha
(74) *Attorney, Agent, or Firm* — Posz Law Group, PLC

(57) ABSTRACT

A bearing member includes a bearing part that rotationally supports a rotational body, a load application part formed in the bearing part, wherein the load application part contacts the rotational body and applies a load to the rotational body in a radial direction of the rotational body, and a holding groove formed in the bearing part in a rotation axis direction of the rotational body, wherein the holding groove has an opening at one end, wherein the holding groove is adapted to hold a lubricant that is to be supplied to a sliding contact area between the rotational body and the load application part.

14 Claims, 5 Drawing Sheets

BEARING MEMBER, BELT UNIT, AND IMAGE FORMING DEVICE

CROSS REFERENCE TO RELATED APPLICATION

The present application is related to, claims priority from and incorporates by reference Japanese Patent Application No. 2008-172554, filed on Jul. 1, 2008.

TECHNOLOGY FIELD

The present application relates to a bearing member that supports a rotational body, a belt unit that includes an endless belt placed in tension by the rotational body, and an image forming device in which the belt unit is included.

BACKGROUND

In the past, it is known that an image forming device has plural rotating bodies and a belt unit that includes an endless belt placed in tension between the rotating bodies.

Japanese laid-open patent application No. 2005-189702 discloses technologies for a belt unit and an image forming device. In the belt unit, a belt frame supports a driving roller as a rotational body that is driven to rotate and a driven roller as a rotational body that is driven to rotate according to the rotation of the driving roller through a bearing member, respectively. An endless belt is placed in tension between the driving roller and the driven roller, and is driven according to the rotation of the aforementioned rollers.

SUMMARY

However, there was a problem in a belt unit discussed above. When a driven roller is rotated, a sliding contact area with a bearing member is worn, and consequently, torque is increased at the sliding contact area. As a result, the rotation of the endless belt is unstable and image quality is decreased.

The bearing member, belt unit and image forming device provide a stable movement of an endless belt. This improves the image quality in the image forming device. The bearing member, belt unit and image forming device have the following structures to resolve the problems described above.

A bearing member related to the application includes a bearing part that rotationally supports a rotational body, a load application part formed in the bearing part, wherein the load application part contacts the rotational body and applies a load to the rotational body in a radial direction of the rotational body, and a holding groove formed in the bearing part in a rotation axis direction of the rotational body, wherein the holding groove has an opening at one end, wherein the holding groove is adapted to hold a lubricant that is to be supplied to a sliding contact area between the rotational body and the load application part.

In one aspect, a belt unit includes a rotational body that places an endless belt in tension and a bearing member described above.

In another aspect, an image forming device includes the belt unit described above.

The bearing member maintains the lubricating ability of a bearing part for lengthy periods of time because a lubricant is supplied to a sliding contact area between a rotational body and the bearing part from time to time. Therefore, in a belt unit that includes the above mentioned bearing member, an endless belt placed in tension by a rotational body moves stable; and an image forming device that has the belt unit provides improved image quality.

DETAILED DESCRIPTION

A detailed explanation of the bearing member, belt unit and image forming device is given below with reference to the drawings. A color printer that has the belt unit is explained below as an embodiment.

First Embodiment

Figure 2:
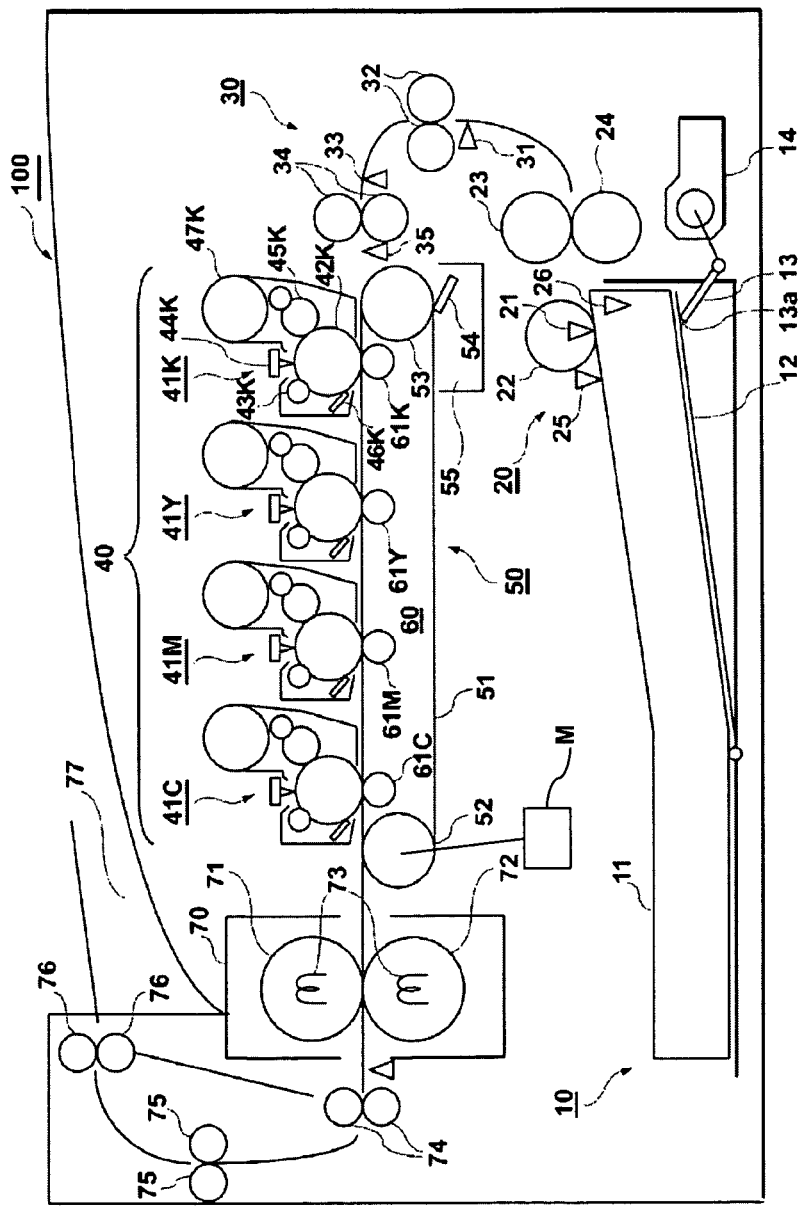
FIG. 2 is a schematic view of a color printer.

FIG. 2 shows a schematic view of a color printer. A color printer 100 according to the present embodiment has a belt unit 50 that carries paper 11, or a recording medium, and forms a color image on the paper 11, as an image forming device, by overlaying four kinds of color toner, black, yellow, magenta, and cyan.

A demountable paper tray 10 is mounted to a lower part of the color printer 100. In the paper tray 10, plural sheets of paper 11 are loaded on a paper carrying pallet 12. The paper carrying pallet 12 is pivotally supported by a supporting shaft (not shown).

Guiding members (not shown) are also provided to control the loading position of the paper 11 in the paper tray 10. The guiding members control the loading position of the paper 11 in both directions, such as a paper feeding direction (in a right-pointing direction in FIG. 2), and an orthogonal direction to the paper feeding direction (sides of the paper 11).

A lift up lever 13 is provided at a paper feeding side of the paper 11 in the paper tray 10. The lift up lever 13 is supported pivotally by a support shaft (not shown) that detachably engages with a motor 14. When the paper tray 10 is mounted to the color printer 100, the support shaft engages the motor 14. The motor 14 is a driving unit that drives the lift up lever 13 in response to control by a controlling unit (not shown). The lift up lever 13 moves pivotally in accordance with drive of the motor 14, so that a tip part 13a lifts up a bottom part of the paper carrying pallet 12. As a result, the loading position of the paper 11 in the paper tray 10 is elevated.

A feeding unit 20 is provided in a paper feeding side in the paper tray 10 to feed one sheet of paper at a time from top of the loaded paper 11 in the paper tray 10. As shown in FIG. 2, the feeding unit 20 includes an ascendance detecting part 21, a pick-up roller 22, a feed roller 23, and a retard roller 24.

The ascendance detecting part 21 is provided above the paper tray 10. The ascendant detecting part 21 detects ascendance of the loading position of the paper 11 and notifies the controlling unit of the paper ascendance. The controlling unit stops drive of the motor 14 in the paper tray 10 based on detection information from the ascendance detecting part 21.

The pick-up roller 22 contacts an upper surface of the paper 11 that has ascended to a certain position, is rotationally driven by a driving unit (not shown), which is driven according to control by the controlling unit, and then feeds the paper 11 from the paper tray 10.

The feed roller 23 and the retard roller 24 make a pair of rollers and separate one sheet of paper from the paper 11 fed by the pick-up roller 22.

The feeding unit 20 further includes an existence detecting part 25 and a remaining amount detecting part 26.

The existence detecting part 25 detects whether the paper 11 exists in the paper tray 10. The remaining amount detecting part 26 detects the amount of the paper 11 in the paper tray 10.

The paper 11 that is separated as one sheet of paper and is fed by the feeding unit 20 is sent to a carrying unit 30. As shown in FIG. 2, the carrying unit 30 includes three sensors, a first paper sensor 31, a second paper sensor 33, and a writing sensor 35. The carrying unit 30 further includes two pairs of rollers, a first pair of carrying rollers 32 and a second pair of carrying rollers 34. Each of the sensors 31, 33, 35 detects passage of the paper 11 and notifies the controlling unit of the passage. Each of the pairs of rollers is driven to rotate by a driving unit (not shown) and carries the paper 11.

The paper 11 that is carried to the carrying unit 30 is sent to the first pair of carrying rollers 32 after the paper 11 passes the first paper sensor 31. When the controlling unit receives the detection information from the first paper sensor 31, the controlling unit controls the driving unit to start rotation of the first pair of carrying rollers 32. In this situation, the start of the rotation of the first pair of carrying rollers 32 is delayed to occur after the time when the paper 11 passes the first paper sensor 31 by the controlling unit. As a result, the paper 11 is pushed into a contacting part of the first pair of carrying rollers 32, so that any misalignment of the paper 11 is corrected. In other words, the paper is straightened, or aligned, when a leading end of the sheet is pushed into engagement with the carrying rollers 32.

After misalignment of the paper 11 is corrected, the paper 11 is carried by the first pair of carrying rollers 32. After the paper 11 passes the second paper sensor 33, the paper 11 reaches at the second pair of carrying rollers 34. The second pair of carrying rollers 34 is driven by the controlling unit to rotate in synchronization with the detection of the paper 11 by the second paper sensor 33. As a result, the second pair of carrying rollers 34 conveys the paper 11 without stoppage. After the paper 11 passes the writing sensor 35, the paper 11 is carried between an image forming unit 40 and a transferring unit 60 by a belt unit 50.

The image forming unit 40 includes four independent toner image forming units 41K, 41Y, 41M, and 41C that are in line along a carrying path of the paper 11.

Each of the toner image forming units, 41K, 41Y, 41M, and 41C, corresponds to LED printing mechanisms of an electrophotographic system for black, yellow, magenta, and cyan, respectively. Each toner image forming unit according to the present embodiment has the same components as shown in FIG. 2. When the toner image forming units, 41K, 41Y, 41M, and 41C, are distinguished from one another, K, Y, M, and C are appended to the reference numeral 41, respectively. However, when the toner image forming units are referred to in general, the reference numeral 41 is used.

The toner image forming unit 41 has an organic photo conductor (OPC) drum 42, or electrostatic latent image supporter, on which a toner image is formed. In the toner image forming unit 41, an electrostatic roller 43, a light emitting diode (LED) head 44, a developing roller 45, and a first cleaning blade 46 are provided in the vicinity of the OPC drum 42.

The electrostatic roller 43, which is a charging device, uniformly charges a surface of the OPC drum 42. The LED 44 head is configured with an LED array. The LED head 44, which is an exposing device, forms an electrostatic latent image on the charged OPC drum 42 based on image data. The developing roller 45, or developing device, forms a toner image by adhering toner, which is frictionally electrified, to the electrostatic latent image on the surface of the OPC drum 42. The first cleaning blade 46, which is a cleaning means, scrapes remaining toner off the surface of the OPC drum 42 after a transferring process.

The toner image forming unit 41 further includes a toner supplying unit 47 that supplies toner to the developing roller 45.

In the belt unit 50, a carrying belt 51 is placed in tension between a driving roller 52 and a driven roller 53. The carrying belt is an endless belt to carry the paper 11 by electrostatic stiction.

The driving roller 52 is a rotational body and is driven to rotate by a driving unit M. The driven roller 53 makes a pair with the driving roller 52. The driven roller 53 is a rotational body and is driven to rotate in response to the rotation of the driving roller 52. The carrying belt 51, which is at the lower side of the image forming unit 40, is driven in response to the rotation of the driving roller 52 and the driven roller 53.

A second cleaning blade 54, which serves as a cleaning means, is provided to contact with a lower surface of the carrying belt 51, and scratches remaining toner, dust, and so on off the surface of the carrying belt 51 in response to a rotatable running of the carrying belt 51. The removed toner, dust, and so on are contained in a toner box 55 provided below the second cleaning blade 54.

OPC drums, 42K, 42Y, 42M, and 42C are exposed at a bottom part of the image forming units 41K, 41Y, 41M, and 41C, respectively. Each of transferring rollers, 61K, 61Y, 61M, and 61C, forms a transferring unit 60, or a transferring device, and is provided inside a loop of the transferring belt 51 along a carrying path of the paper 11 below and in opposition to the OPC drums, 42K, 42Y, 42M, and 42C, respectively.

The image forming unit 40, the transferring unit 60, and the belt unit 50 are synchronously driven by the controlling unit. The paper 11 that is fed from the carrying unit 30 is placed on the carrying belt 51 by electrostatic stiction, and then the paper 11 is carried between the OPC drum 42K and the transferring roller 61K. Since a transferring voltage is applied to the transferring roller 61K, a toner image in black color on the surface of the OPC drum 42K is transferred on the surface of the paper 11. Next, the paper 11 is sequentially carried between each of the OPC drums 42Y, 42M, and 42C, and the corresponding transferring roller 61Y, 61M, and 61C. Respective colors of a toner image are thus sequentially transferred on the surface of the paper 11. The paper 11, which carries a transferred four-color toner image, is carried to a fixing unit 70 according to the motion of the carrying belt 51.

The fixing unit 70 includes a pair of rollers, an upper roller 71 and a lower roller 72. Each of the upper roller 71 and the lower roller 72 includes an internally-located halogen lamp 73, as a heat source. Surfaces of the upper roller 71 and the lower roller 72 are made of elastic material. The paper 11 that is carried from the image forming unit 40 to the fixing unit 70 is heated and pressed by the upper roller 71 and the lower roller 72. As a result, each color of the toner image that has been transferred to the paper 11 is dissolved and fixed on the surface of the paper 11. The paper 11 is then carried to ejecting rollers 74, 75, and 76, and then the paper 11 is ejected to a stacker unit 77 located at an upper side of the color printer 100.

Figure 3A:
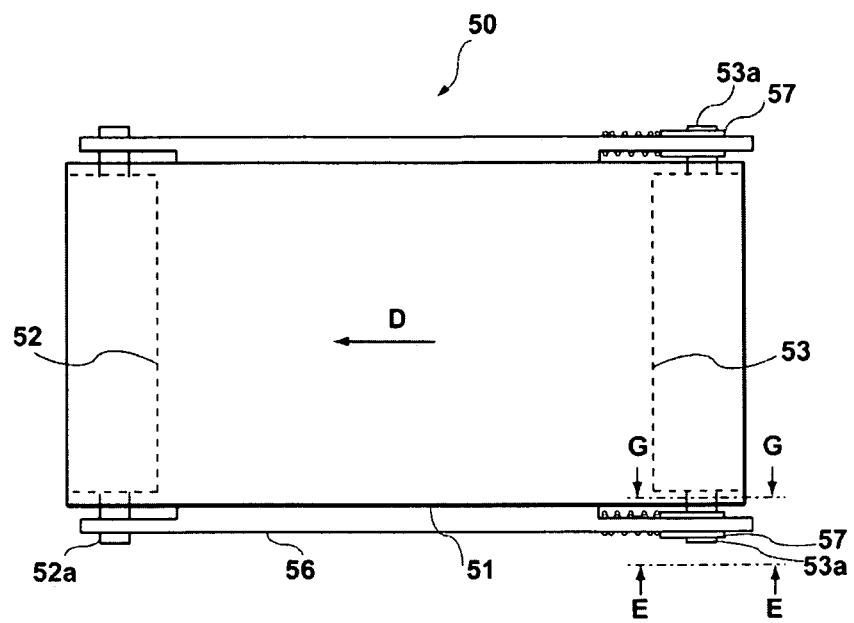
FIG. 3A is a schematic plan view and FIG. 3B is a schematic side view of a belt unit.
Figure 3B:
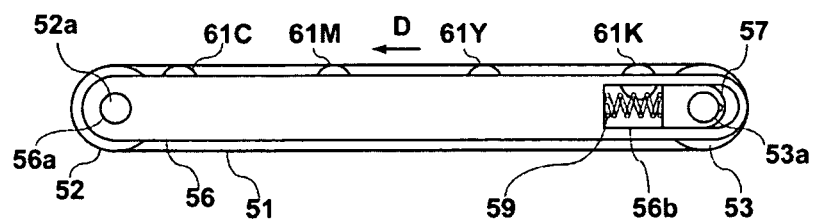

A detailed explanation of the structure of a belt unit 50, which has a bearing member, is given below with reference to FIGS. 3A and 3B. FIGS. 3A and 3B schematically show a belt unit. FIG. 3A shows a top plan view of the belt unit 50. FIG. 3B is a side view of the belt unit 50.

As shown in FIGS. 3A and 3B, the belt unit 50 includes a driving roller 52, a driven roller 53, which is approximately parallel to the driving roller 52, a carrying belt 51, which is placed in tension by the rollers 52, 53, and a belt frame 56.

In each side of the belt frame 56, a pair of openings 56a and 56b is formed.

A shaft 52a for the driving roller 52 engages with one of openings 56a. The driving roller 52 is rotationally supported by the belt frame 56.

Bearing members 57 are assembled to the other openings 56b, respectively. A shaft 53a for the driven roller 53 engages with each bearing member 57. The driven roller 53 is rotationally supported by the bearing members 57.

In the openings 56b, a spring 59, or biasing member, is installed. The spring 59 is installed between an internal wall of the opening 56b and the bearing member 57 so that the length of the installed spring 59 is shorter than its natural length. In other words, the spring 59 is compressed. Therefore, the spring 59 presses the bearing member 57 with force. The driven roller 53, which is supported by the bearing member 57, is biased in a direction away from the driving roller 52 by the force of the spring 59, and as a result, the carrying belt 51 is placed in tension between the driven roller 53 and the driving roller 52.

The carrying belt 51 is placed in tension between the driving roller 52 and driven roller 53, and runs in the direction of an arrow D in FIGS. 3A and 3B according to the rotation of the rollers 52, 53. Each of transferring rollers 61K, 61Y, 61M, and 61C is provided inside a loop of the carrying belt 51 in the belt unit 50, and a surface of the transferring rollers 61 contacts a back surface of the carrying belt 51 as shown in FIG. 3B.

Figures 1A, 1B, 1C:
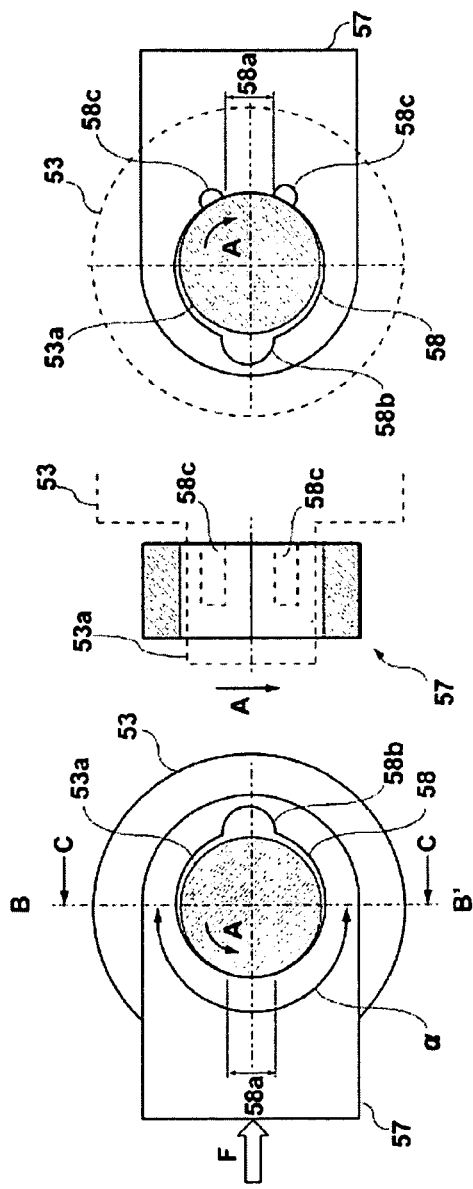
FIGS. 1A and 1C are schematic side views and FIG. 1B is a schematic end view of a structure of a bearing member according to first embodiment.

A detailed explanation of the structure of a bearing member 57 according to one embodiment is given below with reference FIGS. 1A, 1B, and 1C. FIGS. 1A, 1B, and 1C schematically show the bearing member 57.

FIG. 1A is a schematic view of the belt unit 50 shown in FIG. 3A as seen from a direction of the arrows E. Therefore, FIG. 1A is a schematic view of an engagement part between a bearing member 57 and a shaft 53a as seen from the outside of the belt unit 50. FIG. 1B is a sectional view in a B-B' plane of a bearing member 57 and a shaft 53a shown in FIG. 1A as seen from a direction of an arrow C. FIG. 1C is a schematic view of a belt unit 50 shown in FIG. 3A as seen from a direction of an arrow G. Therefore, FIG. 1C is a schematic view of an engagement part between a bearing member 57 and a shaft 53a as seen from the inside of the belt unit 50.

As shown in FIG. 1A, a bearing member 57 has a bearing part 58, which is generally a cylindrical opening. A shaft 53a of a driven roller 53 engages the bearing part 58. The inside diameter of the bearing part 58 is larger than the outside diameter of the shaft 53a.

The bearing member 57 always receives a force in a direction of an arrow F by the spring 59 as shown in FIG. 1A. The bearing part 58 of the bearing member 57 applies a load to the shaft 53a in a radial direction at a contacting part 58a based on the force F. The shaft 53a rotates in the direction of an arrow A while receiving the load from the contacting part 58a. The shaft 53a makes sliding contact with the contacting part 58a of the bearing part 58. An area α (see FIG. 1A) with a semi-cylindrical shape, which includes the contacting part 58a of the bearing part 58, is referred to as a sliding contact area α.

In this embodiment, a coil spring is used for the spring 59, which serves as the biasing member. However, a leaf spring, a gas spring, and elastic materials, such as a rubber, and so on can be used as the biasing member.

As discussed above, the bearing member 57 receives a force F from the spring 59, and in return, the contacting part 58a applies a load on the shaft 53a in the radial direction of the shaft 53a. Therefore, the contacting part 58a itself, or the contacting part 58a and its vicinity, is referred to as a load application part.

An injection groove 58b is provided in a surface opposite to the contacting part 58a in the bearing part 58 of the bearing member 57. The injection groove 58b is a pass-through groove with a semi-cylindrical shape and extends in a direction of the rotation axis of the shaft 53a. As discussed later, the injection groove 58b is provided for injecting grease, or lubricant, after the belt unit 50 is assembled. The injection groove 58b is formed outside of the sliding contact area α.

The sectional shape of the injection groove 58b is not limited to a semi-cylindrical shape. For example, the injection groove 58b can be triangular, rectangular, polygonal or oval.

A pair of holding grooves 58c is provided within the sliding contact area α of the bearing part 58 as shown in FIG. 1C. The holding grooves 58c hold grease, or lubricant. In this embodiment, the holding grooves 58c are formed on both sides of the sliding contact area 58a, and each has a semi-cylindrical shape. As shown in FIG. 1C, each of the holding grooves 58c has an opening inside belt unit 50. However, the opening does not pass completely through to the other side and has a dead end, as shown by broken lines in FIG. 1B.

The sectional shape of the holding groove 58c is not limited to a semi-cylindrical shape. For example, each holding groove 58c can be triangular, rectangular, polygonal or oval. In the present embodiment, two holding grooves 58c are described. However, the number of the holding grooves 58c is not limited to two, and one, two or more holding grooves 58c can be employed. With respect to the location of the holding groove 58c, it is preferred that the two holding grooves 58c are formed in the vicinity of the ends of the contacting part 58a (see FIG. 1C).

The contacting part 58a is an important area for the rotation of the shaft 53a to improve and maintain the mechanical strength for both the shaft 53a and the bearing member 57. Therefore, it is better to avoid placing the holding groove inside the contacting part 58a because it weakens the mechanical strength for both the shaft 53a and the bearing member 57. However, the holding grooves 58c can be formed in other locations as long as the grooves 58c are within the sliding contact area α and outside the area of the contacting part 58a (see FIGS. 1A and 1C).

In this embodiment, two holding grooves are formed at one end of the shaft 53a (see FIGS. 1B and 1C). As shown in FIG. 3A, the shaft 53a has two ends. Therefore, holding grooves 58c can be likewise formed in the other bearing member 57 at the other end of the shaft 53a.

Figure 4:
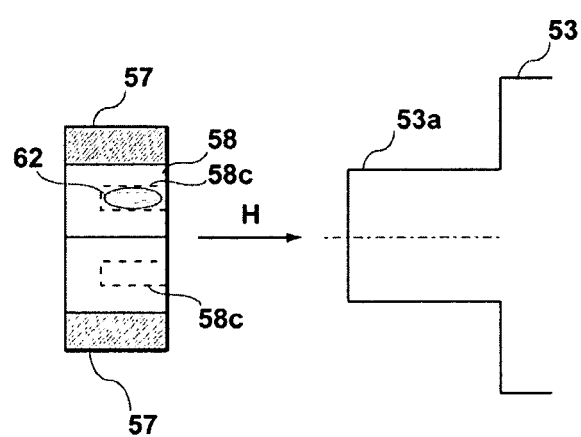
FIG. 4 is an explanatory schematic view of installation of a bearing member.

The installation of the bearing member 57 on the shaft 53a when the belt unit 50 is assembled is given below with reference FIG. 4. FIG. 4 is an explanatory schematic view showing installation of a bearing member 57.

Before assembling, grease 62, or lubricant, is applied to each of the holding grooves 58c in the bearing member 57. Then, the bearing member 57 is assembled the shaft 53a of the driven roller 53 in the direction of an arrow H in FIG. 4. Since the holding grooves 58c do not have an opening at the outside of the belt unit 50, the applied grease 62 does not leak to the outside the belt unit 50 and is held inside the holding grooves 58c.

After grease 62, or lubricant, is applied to each of the holding grooves 58c, which are formed within the sliding contact area α of the bearing part 58, the bearing member 57 is assembled on the shaft 53a of the driven roller 53. Then, each of the bearing members 57 is installed in the openings 56b of the belt frame 56. The belt unit 50 is assembled through the processes described above.

When a printing operation is performed by a color printer 100 (see FIG. 2) that has a belt unit 50, the belt unit 50 is driven in synchronization with an image forming unit 40 and a transferring unit 60. A driven roller 53 is driven to rotate according to the rotation of a driving roller 52. As shown in FIGS. 1A and 1C, the shaft 53a of the driven roller 53 rotates in the direction of the arrow A while the shaft 53a maintains a sliding contact state with the contacting part 58a of the bearing member 57. Because of the sliding rotation of the shaft 53a, the grease 62 that is held in each of holding grooves 58c of the bearing member 57 is supplied to the sliding contact area α between the inside of the bearing member 57 and the outside of the shaft 53a. As a result, grease 62 is supplied from the holding grooves 58c to the contacting part 58a, or load application part, that is between the holding grooves 58c from time to time. Therefore, grease 62 adheres to the contacting part 58a. Because of the supply of grease 62 as discussed above, friction between the shaft 53a and the contacting part 58a is reduced, and an undesirable increase of torque is prevented.

After repeated printing operations are performed in the color printer 100, the contacting part 58a of the bearing member 57 may become worn. In this case, since the shaft 53a comes close to each of the holding grooves 58c (because of wear), the amount of grease 62 supplied from the holding grooves 58c is increased. As a result, the lubrication between the shaft 53a and the contacting part 58a is increased, so that the further development of wear is limited.

Further, wear particles and foreign objects, such as toner from the image forming unit 40 (see FIG. 2), are trapped in the holding grooves 58c. Therefore, acceleration of wear due to those particles and foreign objects, and so on between the shaft 53a and the contacting part 58a, is limited.

When additional grease in the holding grooves 58c is needed after the color printer 100 is used for lengthy periods of time, grease is supplied from the outside of the belt unit 50 through the injection groove 58b. In the bearing member 57, the injection groove 58b of the bearing part 58 is provided outside of the sliding contact area α where the shaft 53a contacts the bearing part 58 (see FIG. 1A). Therefore, the injection groove 58b can be formed in a relatively large size, so that it is suitable to inject grease from an opening located at the outside of the bearing member 57. When too much grease is injected, excess grease is trapped in the holding grooves 58c. Therefore, since grease of the holding groove 58c is continuously supplied to the contacting part 58a, the lubrication between the bearing part 58 and the shaft 53a is maintained.

As discussed above, the bearing member 57 according to the present embodiment continuously supplies grease between the shaft 53a and the contacting part 58a from the holding grooves 58c in the bearing part 58 while the driven roller 53 rotates, so that friction between the shaft 53a and the contacting part 58a is reduced and the lubrication is maintained for lengthy periods of time. Therefore, in the belt unit 50, the carrying belt that is placed in tension by the driven roller 53 runs in a stable manner. Further, in a color printer that has the belt unit, good quality images are formed.

Because the holding grooves 58c do not pass completely through to the outward end of the bearing unit 57 and have a dead end, leaking grease is prevented at the time of assembling of the belt unit 50. Therefore, usability is improved. Since the injection groove 58b, which has a relatively large size, is formed in the bearing part, additional grease can be injected through the injection groove 58b. Therefore, the belt unit 50 can be used for a long period of time, and the amount of waste is reduced due to less frequent part replacement, resulting in environmental preservation.

Since wear particles and foreign objects in the contacting part between the bearing part and the shaft are trapped into the holding grooves, acceleration of wear can be avoided and durability is improved. The shape of the bearing member is suitable for the injection molding; therefore, it can be manufactured at relatively lower cost.

Second Embodiment

FIG. 5 shows a schematic view of a structure of a bearing member according to second embodiment. In a bearing member 80 according to the second embodiment, the position of an injection groove 81b and a holding groove 81c in a bearing part 81 is different from that of the first embodiment discussed above. In this embodiment, the same structures of the first embodiment are shown as the same reference numerals, and a detailed explanation for them is omitted.

Figure 5C:
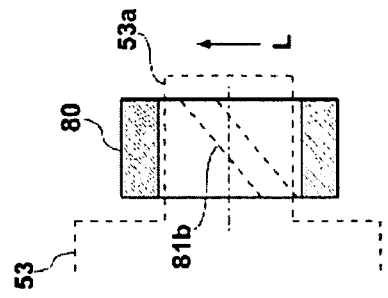
FIG. 5A is a schematic side view and FIGS. 5B and 5C are schematic end views of a structure of a bearing member according to second embodiment.
Figure 5B:
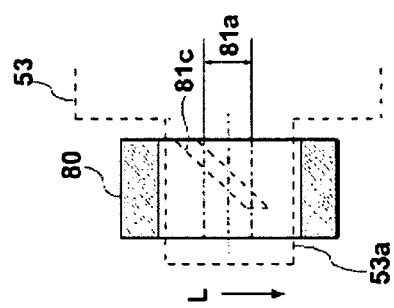
Figure 5A:
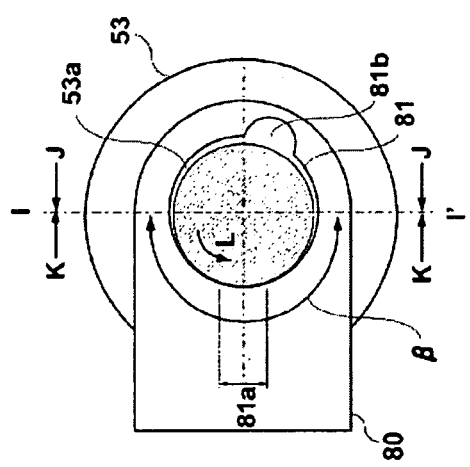

FIG. 5A shows a schematic view of an engagement part between a bearing member 80 and a shaft 53a in a belt unit seen from the outside of the belt unit. FIG. 5B shows a sectional view in an I-I' plane of a bearing member 80 and a shaft 53a shown in FIG. 5A seen from a direction of an arrow J. FIG. 5C shows a sectional view in an I-I' plane of a bearing member 80 and a shaft 53a shown in FIG. 5A seen from a direction of arrows K.

As shown in FIG. 5A, a bearing member 80 according to the present embodiment includes a bearing part 81 in which the inside diameter of the bearing part 81 is larger than the outside diameter of a shaft 53a of a driven roller 53. The bearing part 81 is cylindrical. The shaft 53a engages with the bearing part 81.

The bearing part 81 adds a load to the shaft 53a in a radial direction at a contacting part 81a. The shaft 53a rotates in a direction of an arrow L while receiving the load from the contacting part 81a. The shaft 53a makes sliding contact with the contacting part 81a of the bearing part 81. An area β (see FIG. 5A) with a semi-cylindrical shape, which includes the contacting part 81a of the bearing part 81, is referred to as a sliding contact area β.

As shown in FIGS. 5A and 5C, an injection groove 81b in which grease is injected is formed in the outside of the sliding contact area β. As shown in FIG. 5B, a holding groove 81c that hold grease is formed in the sliding contact area β.

The holding groove 81c is formed to extend across the contacting part 81a at an angle and has an opening only at an internal end of the belt unit. Grease is applied to the holding groove 81c through the opening when the belt unit is assembled.

As shown in FIG. 5B, even though the holding groove 81c extends across the contacting part 81, the crossing area is very small. Therefore, the holding groove 81c does not significantly weaken the mechanical strength of the shaft 53a or the bearing member 80, as discussed above.

As shown in FIG. 5C, the injection groove 81b is formed to extend across the bearing part 80 at an angle and has openings at both internal and external ends of the belt unit. The size of the injection groove 81b is relatively large, so that grease can be injected through the opening in the outer end of the bearing part 80 after the belt unit is assembled.

In this embodiment, the holding groove 81c and the injection groove 81b are formed to have the same angle of inclination to the rotation axis of the shaft 53a to facilitate manufacture of the bearing member 80 by injection molding.

An explanation of the operation of a belt unit that has the bearing member 80 according to the present embodiment is given below.

As discussed above, the holding groove 81c is formed to go across the contacting part 81a at an angle. While the driven roller 53 of the belt unit rotates, the shaft 53a makes sliding contact with the contacting part 81a of the bearing part 81 and also contacts grease held in the holding groove 81c. Because of the sliding rotation of the shaft 53a, grease is directly supplied from the holding groove 81c to the shaft 53a. Excess grease is collected in the bottom of the holding groove 81c by the rotation of the shaft 53a.

In a bearing member 80 according to the present embodiment, a holding groove 81c is formed in consideration of maintaining sufficient area for the contacting part 81, at which the shaft 53a contacts the bearing part 81 and maintaining direct contact between the shaft and grease, so that grease is efficiently supplied to the contacting part 81a. Therefore, it is possible to improve lubrication. Because the holding groove 81c is formed at an angle, wear particles and foreign objects will be trapped. Therefore, improved lubrication can be maintained for lengthy periods of time.

In each of embodiments described above, the present invention is applied to a belt unit that carries paper as a recording medium and a color printer that has the belt unit as embodiments. However, the present invention is not limited to those embodiments. For example, the present invention can be applied to an electrophotographic printer using an intermediate transferring method in which an image is transferred into a recording medium after the image is formed on the surface of an endless belt, and a belt unit that is installed in the aforementioned electrophotographic printer.

What is claimed is:

1. A bearing member comprising:
a bearing part that rotationally supports a rotational body and that includes a sliding contact area where the rotational body continuously slidably contacts the bearing part during rotation thereof, and a non-sliding contact area that is formed outside of the sliding contact area and where the bearing part is free from contact by the rotational body during the rotation thereof;
a load application part formed in the sliding contact area, wherein the load application part is configured to contact the rotational body and to continuously apply a load to the rotational body in a radial direction of the rotational body;
a plurality of holding grooves formed in the sliding contact area in the rotation axis direction of the rotational body, wherein the plurality of holding grooves each having an opening at only one end, and the plurality of holding grooves are adapted to hold a lubricant that is to be supplied to the sliding contact area between the rotational body and the load application part;
an injection groove is formed in a part of the non-sliding contact area in a rotation axis direction of the rotational body; and
a force receiving surface that is formed outside the bearing member, wherein
the bearing part is formed inside the bearing member,
the force receiving surface is configured to receive a force and to transmit the force to the load application part, thereby resulting in the load applied by the load application part, and
openings of the plurality of holding grooves are formed on the same side of the bearing part in the rotation axis direction of the rotational body.

2. The bearing member according to claim 1, the plurality of holding grooves are formed at opposite ends of the load application part, respectively, in a rotation direction of the rotational body.

3. The bearing member according to claim 1, wherein
the injection groove has two ends and openings at the two ends, respectively, and
the injection groove receives lubricant through at least one of the openings.

4. The bearing member according to claim 3, wherein the injection groove is formed in a part of the bearing part that is opposite to the load application part.

5. A belt unit comprising:
a rotational body that includes first and second ends;
an endless belt that is placed in tension by the rotational body; and
a bearing member including a bearing part that is attached to, and rotationally supports, the first end of the rotational body and that includes a sliding contact area where the rotational body continuously slidably contacts the bearing part during rotation thereof, and a non-sliding contact area that is formed outside of the sliding contact area and where the bearing part is free from contact by the rotational body during the rotation thereof; and
a force receiving surface that is formed outside the bearing member, wherein
a load application part is formed in the sliding contact area, where the load application part is configured to contact the rotational body and to continuously apply a load to the rotational body in a radial direction of the rotational body,
a plurality of holding grooves are formed in the sliding contact area in the rotation axis direction of the rotational body, the plurality of holding grooves each have an opening at only one end, and the plurality of holding grooves are adapted to hold a lubricant that is to be supplied to the sliding contact area between the rotational body and the load application part,
each opening of the plurality of holding grooves opens toward the second end of the rotational body,
a pass-through groove is formed in a part of the non-sliding contact area in a rotation axis direction of the rotational body,
the force receiving surface is configured to receive a force and to transmit the force to the load application part, thereby resulting in the load applied by the load application part,
openings of the plurality of holding grooves are formed on the same side of the bearing part in the rotation axis direction of the rotational body.

6. The belt unit according to claim 5, wherein the plurality of holding grooves are formed at opposite ends of the load application part, respectively, in a rotation direction of the rotational body.

7. The belt unit according to claim 5, wherein
the rotational body includes a shaft, and
the load application part applies a load to the shaft.

8. The belt unit according to claim 5, wherein
the pass-through groove has two ends and openings at the two ends, respectively.

9. The belt unit according to claim 8, wherein the pass-through groove is an injection groove that is configured to receive lubricant through at least one of the openings.

10. The belt unit according to claim 9, wherein the injection groove is formed in a part of the bearing part that is opposite to the load application part.

11. The belt unit according to claim 5, wherein the rotational body is a driven roller that is driven to rotate in response to a running of the endless belt.

12. The belt unit according to claim 11, further comprising:
a driving roller that moves the endless belt, and
a biasing member biasing the driven roller in a direction away from the driving roller, wherein the biasing member presses the bearing part.

13. An image forming device comprising:
a recording medium tray that loads a recording medium;
a carrying unit that carries the recording medium;
an image forming unit that forms an image on the recording medium;
a belt unit that is formed close to the image forming unit;
a stacker unit that stacks the recording medium formed with an image, wherein
the belt unit comprises:
  a rotational body that includes first and second ends,
  an endless belt that is placed in tension by the rotational body,
  a bearing member including a bearing part that is attached to, and rotationally supports, the first end of the rotational body and that includes a sliding contact area where the rotational body continuously slidably contacts the bearing part during rotation thereof, and a non-sliding contact area that is formed outside of the sliding contact area and where the bearing part is free from contact by the rotational body during the rotation thereof, and
  a force receiving surface that is formed outside the bearing member,
a load application part formed in the sliding contact area, wherein the load application part is configured to contact the rotational body and to continuously apply a load to the rotational body in a radial direction of the rotational body,
a plurality of holding grooves formed in the sliding contact area, the plurality of holding grooves each have an opening at only one end, and the plurality of holding grooves are adapted to hold a lubricant that is to be supplied to the sliding contact area between the rotational body and the load application part,
each opening of the plurality of holding grooves opens toward the second end of the rotational body,
an injection groove is formed in a part of the non-sliding contact area in a rotation axis direction of the rotational body,
the force receiving surface is configured to receive a force and to transmit the force to the load application part, thereby resulting in the load applied by the load application part, and
openings of the plurality of holding grooves are formed on the same side of the bearing part in the rotation axis direction of the rotational body.

14. The image forming device according to claim 13, wherein
the injection groove has two ends and openings at each of the two ends, respectively, and
the injection groove receives lubricant through at least one of the openings.

* * * * *